No. 782,384. PATENTED FEB. 14, 1905.
L. W. DROEGEMEIER.
AUTOMATIC EXTENSION FEEDER FOR CARRIERS.
APPLICATION FILED MAY 7, 1904.
5 SHEETS—SHEET 4.
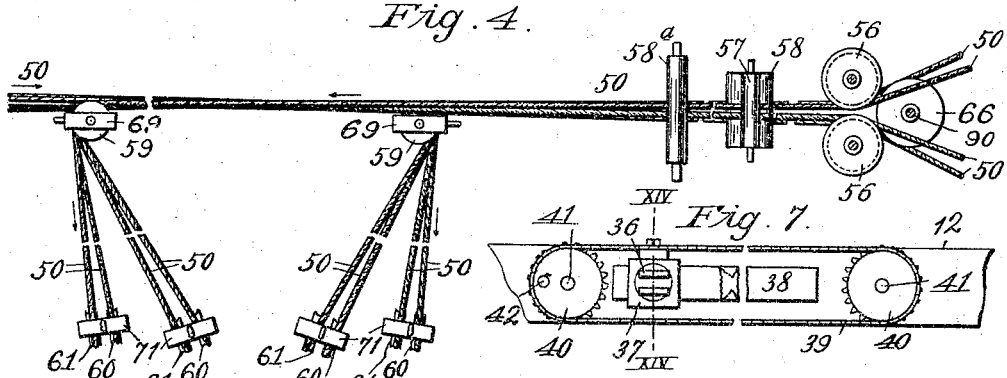
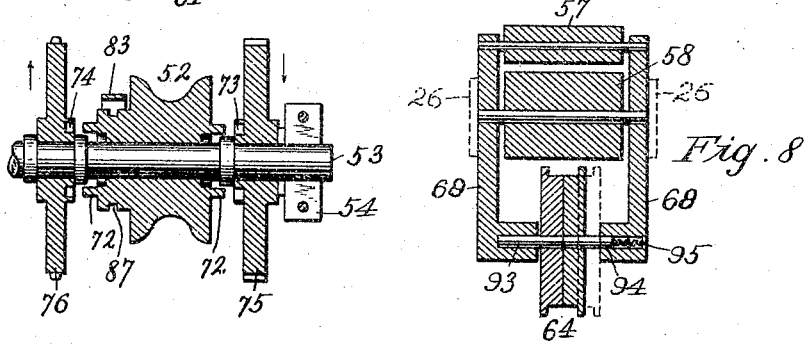
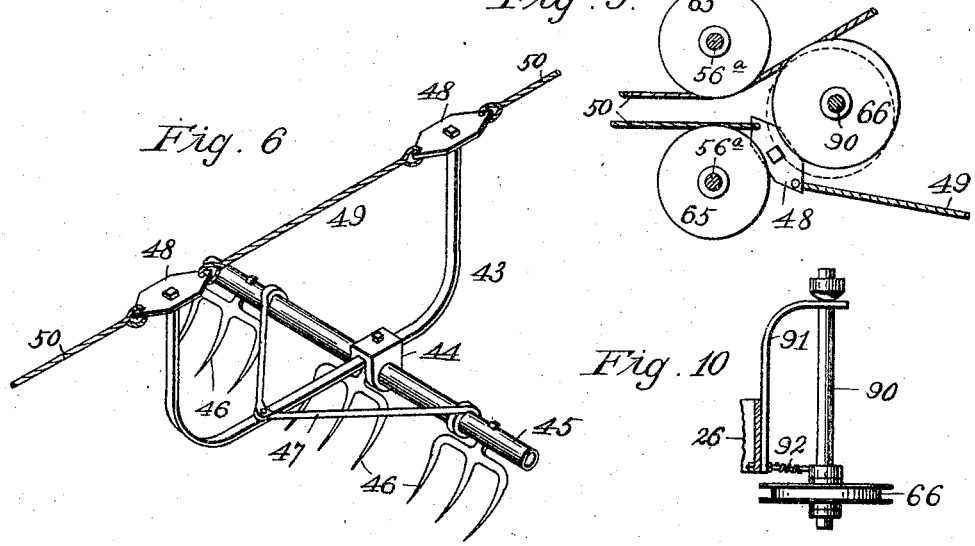
Witnesses:
W. C. Single.
J. Moore
Inventor:
Louis W. Droegemeier
By F. G. Fischer
Atty.

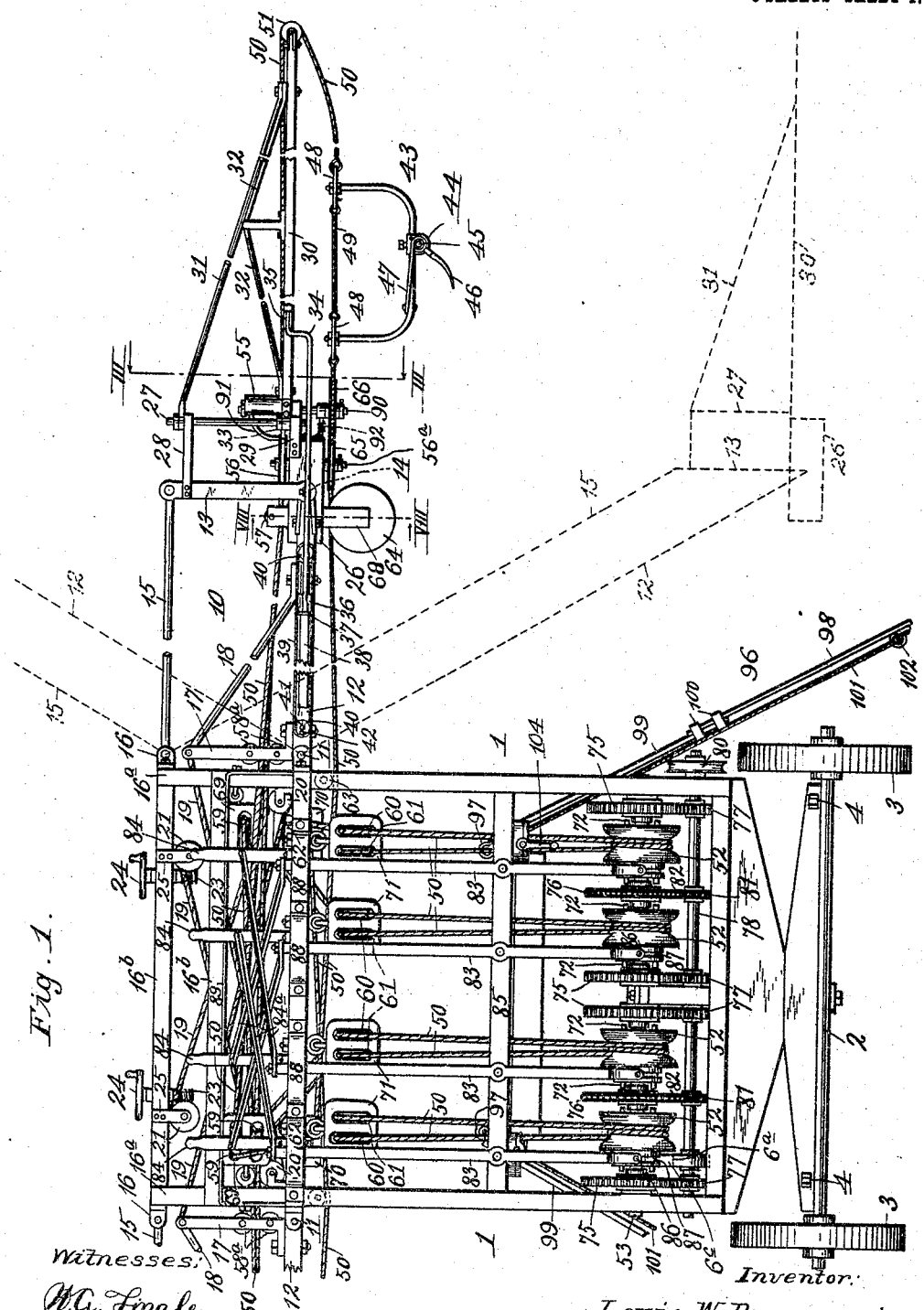

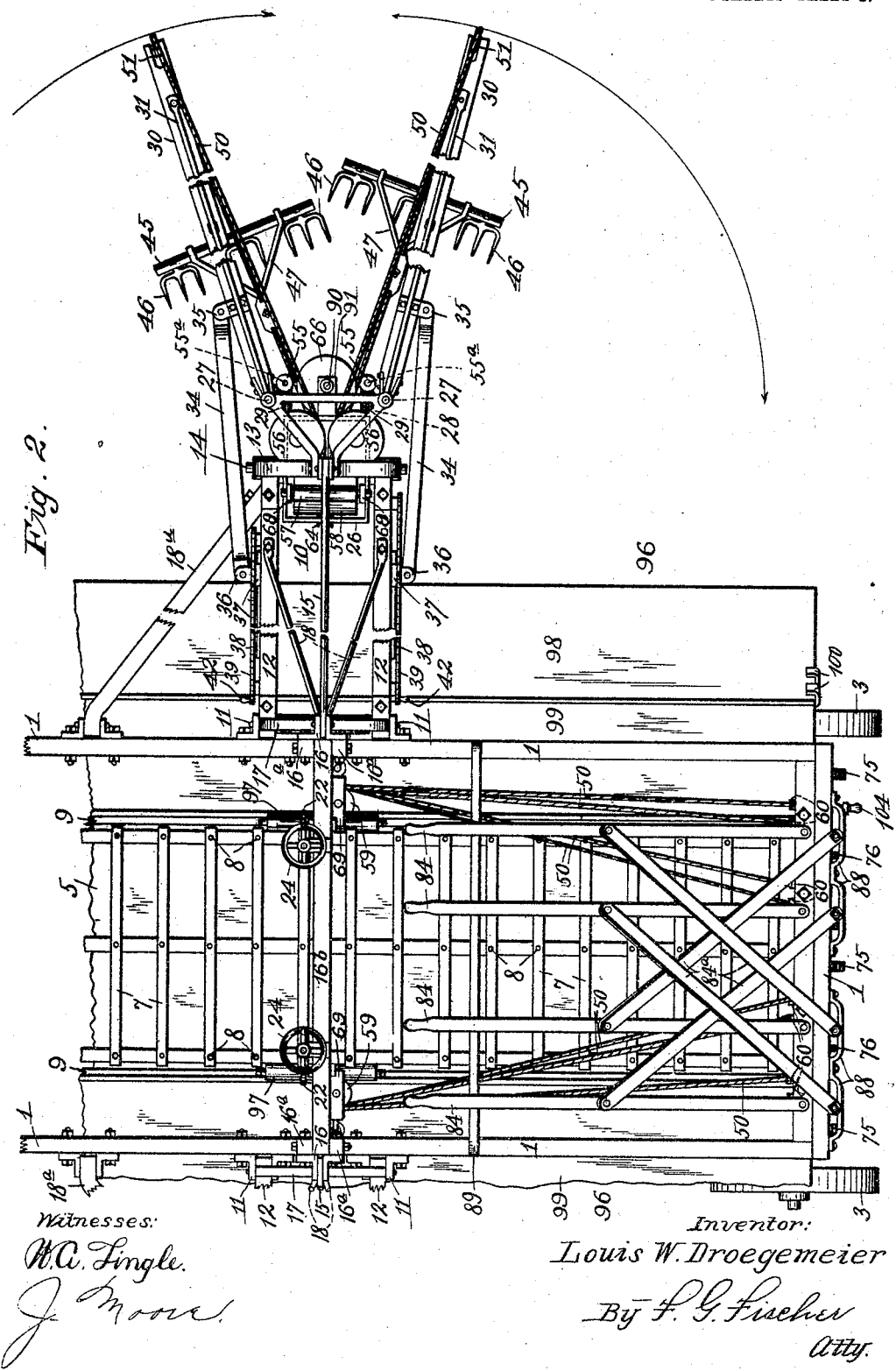

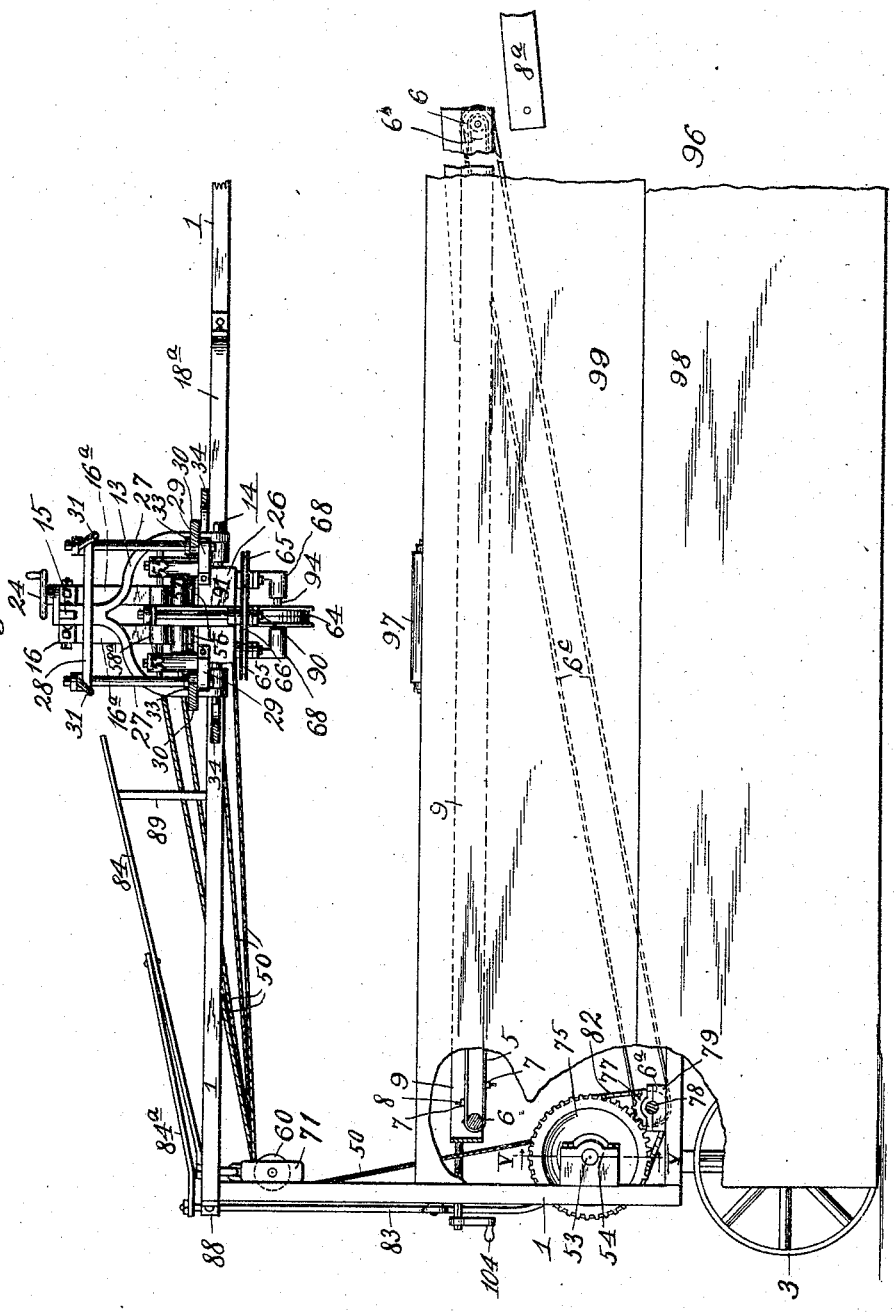

No. 782,384. PATENTED FEB. 14, 1905.
L. W. DROEGEMEIER.
AUTOMATIC EXTENSION FEEDER FOR CARRIERS.
APPLICATION FILED MAY 7, 1904.

5 SHEETS—SHEET 5.

Witnesses:

Inventor:
Louis W. Droegemeier
By F. G. Fischer
Atty.

No. 782,384.                                            Patented February 14, 1905.

UNITED STATES PATENT OFFICE.

LOUIS W. DROEGEMEIER, OF ELLSWORTH, KANSAS.

AUTOMATIC EXTENSION-FEEDER FOR CARRIERS.

SPECIFICATION forming part of Letters Patent No. 782,384, dated February 14, 1905.

Application filed May 7, 1904. Serial No. 206,846.

*To all whom it may concern:*

Be it known that I, LOUIS W. DROEGEMEIER, a citizen of the United States, residing at Ellsworth, in the county of Ellsworth and State of Kansas, have invented certain new and useful Improvements in Automatic Extension-Feeders for Carriers, of which the following is a specification.

My invention relates to improvements in automatic extension-feeders for thresher-carriers, and my object is to provide means for taking grain from the stack and delivering it to the carriers of threshing-machines.

The important features of the invention consist in a feeder communicating with the carrier of the thresher, one or more forks for conducting the grain from the stack to the feeder, and means for elevating and depressing the forks.

The invention further consists in the novel construction, combination, and arrangement of parts hereinafter described, and pointed out in the claims, and in order that it may be fully understood reference will now be made to the accompanying drawings, in which—

Figure 11:
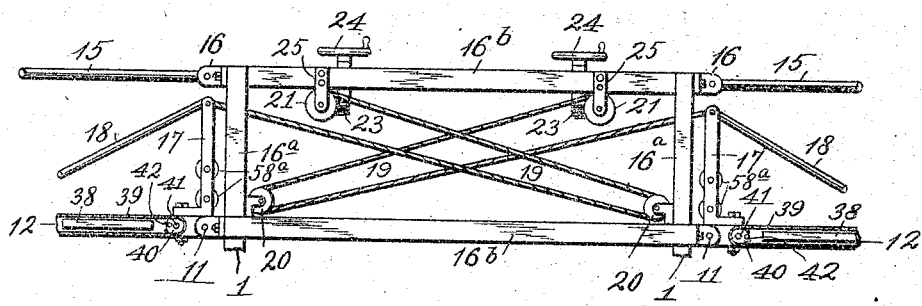
Figure 12:
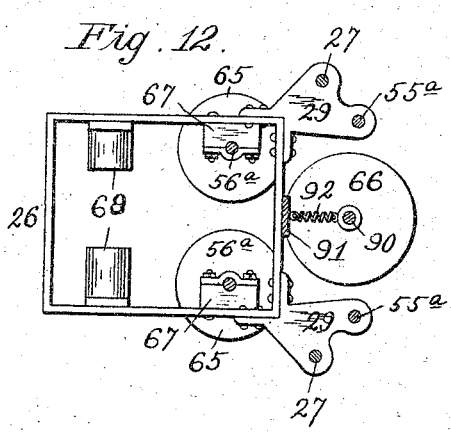
Figure 13:
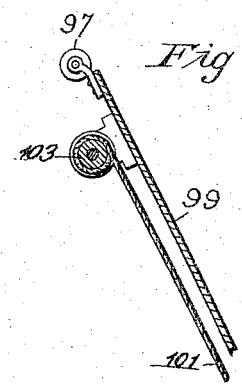
Figure 14:
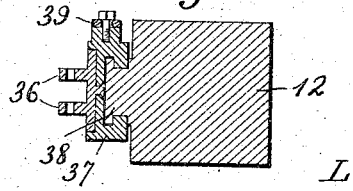

Figure 1 represents a front elevation of the apparatus embodying the invention. Fig. 2 is a plan view of the same. Fig. 3 is a section of the apparatus taken on line III III of Fig. 1. Fig. 4 is a plan view of the cables for carrying the forks and the sheave-wheels for guiding said cables, all of which form part of the invention. Fig. 5 is a vertical sectional view of a part of the reversing mechanism for causing the forks to travel back and forth between the stack and the feeder, taken on line V V of Fig. 3. Fig. 6 is a detail perspective view of one set of forks and its carrying-frame. Fig. 7 is a broken detail side elevation of the mechanism for swinging arms forming part of the invention laterally. Fig. 8 is a vertical section taken on line VIII VIII of Fig. 1, showing a plurality of rollers for guiding the forks and a split roller arranged to permit the passage of the fork-frames therethrough. Fig. 9 is a detail plan view of a plurality of sheave-wheels which assist in guiding the fork-carrying cables. Fig. 10 is a side elevation of one of said sheave-wheels, showing the manner in which it is adjustably mounted. Fig. 11 is a detail side elevation of the mechanism for raising and lowering the vertically-adjustable frames. Fig. 12 is an enlarged detail plan view of a rectangular frame pivotally secured to the outer end of each vertically-adjustable frame. Fig. 13 is a broken vertical section of the upper portion of an inclined guide forming part of the invention. Fig. 14 is a transverse section of a cross-head taken on line XIV XIV of Fig. 7.

In carrying out the invention I employ a feeder-frame 1, secured at its rear end to the threshing-machine or separator (not shown) and provided at its forward end with a swiveled axle 2, mounted in carrying-wheels 3 and provided with clevis-bolts 4 for the reception of a tongue (not shown) to which draft-animals are hitched when the machine is to be moved from place to place.

5 designates an endless belt operating over rollers 6 and provided with transverse slats 7, armed with projecting pins 8 for engaging the grain to convey the same to the carrier $8^a$ of the separator. The shaft of the rear roller 6 is driven by a pulley $6^a$, connected to a drive-pulley $6^b$ by an endless belt $6^c$.

9 designates the side boards of the feeder, which prevent the grain from leaving belt 5 as it is conducted back to the carrier.

10 designates a pair of vertically-adjustable frames secured by hinges 11 to the opposite sides of the upper portion of frame 1, and each consists of a pair of supporting-beams 12, a yoke 13, pivoted at its lower ends to a pintle 14, extending transversely through the outer terminals of beams 12, a rod 15, paralleling beams 12 and pivotally secured at its opposite ends to the upper end of yoke 13, and ears 16, which latter are secured to the upper ends of standards $16^a$, united by transverse beams $16^b$. Frames 10 are provided near their inner ends with yokes 17, bolted upon beams 12 and supported by braces 18, converging upwardly from the forward portion of the beams, which latter are held from lateral movement by braces $18^a$, hinged to the upper part of frame 1 so they may swing up and down with beams 12. Frames 10 are elevated and depressed to the positions shown in dotted lines, Fig. 1, by cables 19, attached at one end to yokes 17, from which they extend rearwardly to sheave-wheels 20, thence obliquely to windlasses 21, provided with worm-wheels 22, meshing with worms 23, operated by hand-wheels 24. Windlasses 21 are journaled in bearings 25, secured to the upper transverse beam 16$^b$. By making rods 15 equal in length to beams 12 yoke 13 will always be maintained in a vertical position regardless of the angles at which said rods and beams extend.

26 designates two rectangular frames supported by pintles 14 and retained in a horizontal position, or at right angles to yoke 13, by pintles 27 and triangular braces 28, which latter are secured at their opposite ends to the upper portions of the pintles and the yoke. The lower ends of the pintles rest in bearings 29, extending forwardly from the upper portion of the rectangular frame 26.

30 designates a pair of laterally-adjustable arms pivotally secured at their rear ends to pintles 27 and supported at their outer ends by braces 31, extending rearwardly to the upper ends of the pintles. 32 indicates trusses secured to the opposite ends of the arms for the purpose of adding rigidity to the latter. Pintles 27 are provided with collars 33, which may be removed so the pintles can be withdrawn from braces 28 and bearings 29 should it be desirable to remove arms 30. The free ends of arms 30 are adjusted laterally by shifting links 34, pivotally secured at their opposite ends to ears 35 and 36, which latter are pivotally secured to cross-heads 37. Ears 35 are pivotally secured to the outer sides of arms 30 in order that the shifting links may accommodate themselves to the angle existing between frames 10 and arms 30 when the frames are elevated or depressed. Cross-heads 37 are slidingly arranged on grooved guides 38, secured to the outer sides of beams 12, and are attached at their upper ends to endless spocket-chains 39, operating around sprocket-wheels 40, mounted upon stub-shafts 41, projecting from the outer sides of beams 12. The pair of sprocket-wheels mounted near the hinged ends of the beams are provided with cranks 42 and operate the sprocket-wheels and chains when it is desired to slide the cross-heads backward or forward.

43 designates a pair of U-shaped frames provided at their lower portions with depending ears 44, carrying transverse bars 45, provided with a plurality of rearwardly-inclined hay-forks 46 and having their outer ends secured by braces 47, attached at their converging forward ends to the lower portions of the frames. The upper terminals of frames 43 are provided with pivotally-secured double-pointed wedges 48, normally held in longitudinal alinement by connecting-cables 49 50, which latter operate over sheave-wheels 51, journaled in the outer ends of arms 30, and wrap around drums 52, loosely mounted upon a counter-shaft 53, journaled in bearings 54, secured to the front standards of frame 1. The upper strands of cables 50 are guided to drums 52 by vertically-arranged rollers 55, horizontal sheave-wheels 56, horizontal rollers 57 58, horizontal rollers 58$^a$, horizontal sheave-wheel 59, and vertically-arranged sheave-wheels 60. The lower strands extend upwardly to vertically-arranged sheave-wheels 61, thence to horizontal sheave-wheels 62, horizontal rollers 63, vertically-arranged split rollers 64, horizontal sheave-wheels 65 66, and are attached to the rear wedges. Rollers 55 are journaled on shafts 55$^a$ in bearings 29 and prevent the upper strands of cables 50 from contacting with pintles 27 when arms 30 are swung around at right angles to frame 10. The shafts 56$^a$ of sheave-wheels 56 65 are secured in boxes 67 on the rectangular frame. Sheave-wheels 56 prevent cables 50 from contacting with boxes 68 when arms 30 are swung around at right angles to frame 10. Rollers 57 58 are journaled in the upper part of boxes 68, secured to the rear portion of the rectangular frame, and hold cables 50 in engagement with sheave-wheels 56 when frame 10 is elevated or depressed. Rollers 58$^a$ are journaled in standards 17 for the purpose of holding cables 50 in engagement with sheave-wheels 59 when frame 10 is elevated or depressed. Sheave-wheels 59 60 61 62 are journaled in blocks 69 70 71, respectively, suspended from the upper portion of frame 1, and guide cables 50 to and from drums 52. Drums 52 are slidingly arranged upon shaft 53 and provided at each side with clutch members 72, adapted to alternately engage companion clutch members 73 74 on the adjacent sides of cog-wheels 75 and sprocket-wheels 76, respectively. Cog-wheels 75 intermesh with and are driven by pinions 77, rigidly mounted upon a drive-shaft 78, journaled in bearings 79 and provided at one end with a sheave-wheel 80, driven by cable from a suitable part of a traction-engine. (Not shown.) Sprocket-wheels 76 are driven in a reverse direction to that of cog-wheels 75 by small sprocket-wheels 81, rigidly mounted on shaft 78 and connecting sprocket-chains 82. The drums are independently shifted by compound levers 83 84, operatively secured together by connecting-bars 84$^a$. Levers 83 are fulcrumed on beam 85 of frame 1, and their lower forked ends are provided with inwardly-extending pins 86, which engage peripheral grooves 87 in the hubs of drums 52, while the upper ends of said levers operate in slots formed by one of the upper transverse bars of frame 1 and guides 88 secured thereto. By thus independently operating the drums the forks at either side of the feeder may be drawn from the latter to the stack and back again without conflicting with each other. The lower ends of levers 84 extend upwardly and rearwardly close to wheels 24 and cranks 42, all of which are within convenient reach of two or more attendants standing upon the upper opposite sides of frame 1, and said rear ends of levers 84 are supported upon a U-shaped bar 89, secured to the upper portion of frame 1. When one of the forks is drawn back toward the feeder with a charge of grain, the wedges 48 on the fork-frame successively contact with sheave-wheel 66 and force the latter outwardly from the adjacent sheave-wheel 56 in order to permit the wedges and the fork-frame to pass. This movement of sheave-wheel 66 is attained by mounting it upon the lower end of a short vertical shaft 90, loosely journaled at its upper end in a bearing 91, secured to the forward end of rectangular frame 26, and is normally held in a vertical position by a retractile spring 92. Split roller 64 is mounted upon two stub-shafts 93 94, journaled in the lower ends of bearings 68, and the two parts of said roller are normally held in contact by a coil-spring 95, interposed between one end of shaft 94 and the inner end of its box, so that when the wedges contact with the flanges of said split roller the two members of the latter will be forced apart and permit said wedges and the fork-frame to pass therethrough, after which the two members are immediately closed by the expansion of spring 95. After the grain has been drawn to the feeder by the forks it is prevented from becoming entangled with frame 1 and the mechanism which the latter carries by means of inclined guides 96, extending from the ground to the upper edge of the side boards 9 and provided at their upper ends with rollers 97, which act as guides for the lower strands of cables 50 when frame 10 is in a depressed position. Each guide 96 consists of two sections 98 99, slidingly secured together by loops 100, so they may be extended or folded by a cable 101, attached to an eye 102 on the lower section and a windlass 103 on the upper portion of the top section. Windlass 103 is operated by a crank 104.

In practice frames 10 are elevated so the forks will clear the top of the stacks, between two of which latter the feeder is drawn. Each fork is then controlled by an operator standing on top of frames 1 close to wheels 24 40, so frame 10 may be gradually lowered as the stacks diminish in height owing to the removal of grain therefrom by the forks. The tops of the stacks are kept practically level by moving the forks laterally a slight distance before taking each charge of grain. A portion of each charge will fall from the forks into the spaces between the inclined guides and the adjacent sides of the stacks until said spaces are filled to a level with the tops of the stacks. Said filling then affords support for the remaining grain as the latter is drawn to the feeder. As the stacks diminish, frames 10 are lowered accordingly until the forks almost touch the ground. As said frames are lowered they draw the forks in toward the inclined guides until the points of the tines touch said guides, which latter prevent the grain from falling back upon the ground or becoming entangled with the mechanism in its passage to the feeder. The inclined guides are folded preparatory to moving the feeder from place to place in order to elevate their lower sections high enough to clear obstacles on the ground. Frames 10 are also elevated to their highest point and each pair of arms 30 are swung around in opposite directions to avoid contact with trees, &c., along the road.

From the above description it is apparent that I have produced a mechanism for conducting grain from the stack to a separator-carrier which is thoroughly effective for the purpose intended, and while I have described the preferred form of construction and operation, I of course reserve the right to make such changes as properly fall within the scope of the appended claims.

Having thus described my invention, what I claim, and desire to secure by Letters Patent, is—

1. In an apparatus of the character described, a feeder mounted upon a suitable frame, vertically-adjustable frames secured to the opposite sides of the feeder-frame, horizontally-adjustable arms secured to the vertically-adjustable frames, hay-forks, and means carried by the frames and the arms for conducting the forks back and forth between the outer terminals of the arms and the feeder.

2. In an apparatus of the character described, a feeder mounted upon a suitable frame, vertically-adjustable frames secured to the opposite sides of the feeder-frame, horizontally-adjustable arms secured to the vertically-adjustable frames, hay-forks, means carried by the frames and the arms for conducting the forks back and forth between the outer terminals of the arms and the feeder, and inclined guides arranged upon opposite sides of the feeder.

3. In an apparatus of the character described, a feeder mounted upon a suitable frame, vertically-adjustable frames secured to the opposite sides of the feeder-frame, horizontally-adjustable arms secured to the vertically-adjustable frames, means for constantly retaining the adjustable arms in a horizontal position, hay-forks, and means carried by the frames and the arms for conducting the forks back and forth between the outer ends of the arms and the feeder.

4. In an apparatus of the character described, a feeder mounted upon a suitable frame, vertically-adjustable frames secured to the opposite sides of the feeder-frame, horizontally-adjustable arms secured to the vertically-adjustable frames, hay-forks, cables for conducting the forks between the outer ends of the adjustable arms and the feeder, drums mounted upon the feeder-frame around which the cables are wound, and means for reversing the motion of said drums.

5. In an apparatus of the character described, a feeder mounted upon a suitable frame, vertically-adjustable frames secured to the opposite sides of the feeder-frame, horizontally-adjustable arms secured to the vertically-adjustable frames, hay-forks, cables for conducting the forks back and forth between the outer terminals of the adjustable arms and the feeder, drums around which the cables are wound, clutch members secured on each side of the drums, a counter-shaft journaled on the feeder-frame and upon which the drums are loosely mounted, gear-wheels loosely mounted on the counter-shaft between the drums and provided at each side with clutch members for engagement with those on the drums, a drive-shaft mounted on the feeder-frame, gear-wheels rigidly mounted thereon which contact with and rotate the gear-wheels on the counter-shaft in opposite directions, and means for shifting the drums laterally so their clutch members will alternately engage the clutch members on the intervening gear-wheels.

6. In an apparatus of the character described, a feeder mounted upon a suitable frame, vertically-adjustable frames secured to the opposite sides of the feeder-frame, horizontally-adjustable arms secured to the vertically-adjustable frames, hay-forks, means carried by the frames and the arms for conducting the forks back and forth between the outer ends of the arms and the feeder, windlasses mounted upon the feeder-frame, and cables for raising and lowering the vertically-adjustable frames attached at their opposite ends to said vertically-adjustable frames and windlasses.

7. In an apparatus of the character described, a feeder mounted upon a suitable frame, vertically-adjustable frames secured to the opposite sides of the feeder-frame, horizontally-adjustable arms secured to the vertically-adjustable frames, shifting links pivotally secured at their opposite ends to the vertically-adjustable frames and the horizontally-adjustable arms, hay-forks, and means carried by the frames and the arms for conducting the forks back and forth between the outer terminals of the arms and the feeder.

8. In an apparatus of the character described, a feeder mounted upon a suitable frame, vertically-adjustable frames secured to the opposite sides of the feeder-frame, horizontally-adjustable arms secured to the vertically-adjustable frames, cross-heads slidingly arranged upon the opposite sides of the vertically-adjustable frames, shifting links pivotally connected at their opposite ends to the cross-heads and the adjustable arms, sprocket-wheels mounted upon the opposite sides of the vertically-adjustable frames, means for rotating said sprocket-wheels, endless chains connecting the sprocket-wheels in pairs and secured to the cross-heads, hay-forks, and means carried by the frames and the arms for conducting the forks back and forth between the outer terminals of the arms and the feeders.

9. In an apparatus of the character described, consisting in a feeder mounted upon a suitable frame, vertically-adjustable frames secured to the opposite sides of the feeder-frame, each consisting of a pair of beams hinged at their inner ends to the feeder-frame, a yoke hinged to the outer end of the beams, and a rod paralleling the beams and pivotally secured at its opposite ends to the feeder-frame and the upper end of the yoke; a rectangular frame arranged between the outer ends of the beams and secured at right angles to the yoke, pintles arranged in bearings carried by the yoke and the rectangular frame, horizontally-adjustable arms hinged to the pintles, guide-pulleys carried by the feeder-frame, the vertically-adjustable frame, the rectangular frame, and the adjustable arms, cables operating over the guide-pulleys, and hay-forks carried by said cables.

10. In an apparatus of the character described, a feeder mounted upon a suitable frame, a vertically-adjustable frame hinged to the feeder-frame, a rectangular frame pivoted to the outer end of the vertically-adjustable frame, a horizontally-adjustable arm pivoted to the rectangular frame, a fork-frame, double-pointed wedges secured to the opposite ends of the fork-frame, a hay-fork secured to said frame, a cable for carrying the fork-frame back and forth between the outer end of the horizontally-adjustable arm and the feeder, guide-pulleys for the cable, mounted upon the feeder-frame, the vertically-adjustable frame, the rectangular frame and the adjustable arm, and a flanged split roller mounted on the rectangular frame in the path of the double-pointed wedges which latter contact with the flanges of the split roller and thus press its two members apart for the passage of the fork-frame.

11. In an apparatus of the character described, a split roller consisting of two members rigidly mounted upon stub-shafts, bearings in which the shafts are journaled, one of said bearings being counterbored beyond the end of the shaft journaled therein, and an expansion-spring interposed between one end of said shaft and the inner end of the counterbore for the purpose of normally holding the members of the pulley together.

In testimony whereof I affix my signature in the presence of two witnesses.

LOUIS W. DROEGEMEIER.

Witnesses:
F. G. FISCHER,
LESLIE E. BAIRD.